US008147736B2

(12) United States Patent
Hayden et al.

(10) Patent No.: US 8,147,736 B2
(45) Date of Patent: Apr. 3, 2012

(54) MOLDING APPARATUS AND METHOD FOR MAKING A CUTTING TOOL

(76) Inventors: John C. Hayden, Bloomfield Village, MI (US); Matthew W. Hayden, Royal Oak, MI (US)

( * ) Notice: Subject to any disclaimer, the term of this patent is extended or adjusted under 35 U.S.C. 154(b) by 196 days.

(21) Appl. No.: 12/639,386

(22) Filed: Dec. 16, 2009

(65) Prior Publication Data
US 2010/0090362 A1 Apr. 15, 2010

Related U.S. Application Data

(62) Division of application No. 11/328,797, filed on Jan. 10, 2006, now abandoned.

(60) Provisional application No. 60/642,635, filed on Jan. 10, 2005.

(51) Int. Cl.
*B29C 43/10* (2006.01)

(52) U.S. Cl. .......... 264/71; 264/604; 264/667; 264/109; 264/125; 425/405.2

(58) Field of Classification Search .................. None
See application file for complete search history.

(56) References Cited

U.S. PATENT DOCUMENTS

| | | | |
|---|---|---|---|
| 3,502,755 A * | 3/1970 | Murray ........................ 264/633 |
| 3,593,373 A * | 7/1971 | Loomis ........................... 425/78 |
| 3,604,060 A | 9/1971 | Lundstrom | |
| 3,632,243 A * | 1/1972 | Mott ............................... 425/78 |
| 4,009,977 A * | 3/1977 | Chao ............................... 425/78 |
| 4,097,977 A * | 7/1978 | Pollner ............................ 445/7 |
| 4,496,299 A * | 1/1985 | Pettersson ................. 425/405.2 |
| 4,655,984 A | 4/1987 | Hinton et al. | |
| 4,934,919 A | 6/1990 | Matsushita et al. | |
| 4,937,025 A | 6/1990 | Foster et al. | |
| 5,672,365 A | 9/1997 | Ishii et al. | |
| 6,054,082 A * | 4/2000 | Heide et al. .................. 264/109 |
| 6,776,941 B2 | 8/2004 | Apte et al. | |

* cited by examiner

*Primary Examiner* — Mary F Theisen
(74) *Attorney, Agent, or Firm* — Young Basile (57) ABSTRACT

A molding apparatus for making a cutting tool includes a cylindrically shaped elastic bag having an internal cavity for receiving a granulated material, such as a mixture of cobalt and carbide. The profile of the interior cavity substantially corresponds to the shape of the cutting tool being produced. The ends of the bag are open to provide access to the interior cavity of the bag. A substantially rigid tubular-shaped pressure sleeve encloses an outer circumference of the elastic bag. A pair of end caps operate to seal the open ends of the elastic bag and are engageable with the ends of the pressure sleeve. The granulated material can be formed into a solid coherent structure by placing the assembled mold containing the granulated material into a hydrostatic press for applying a substantially uniform compressive load to the outer periphery of the elastic bag.

20 Claims, 11 Drawing Sheets

MOLDING APPARATUS AND METHOD FOR MAKING A CUTTING TOOL

RELATED APPLICATIONS

This application claims the benefit under 35 U.S.C. §119 (e) of U.S. Provisional Application Ser. No. 60/642,635 filed Jan. 10, 2005, which is hereby incorporated in its entirety. This application is a divisional of U.S. patent application Ser. No. 11/328,797 filed Jan. 10, 2006, which is hereby incorporated in its entirety.

FIELD OF THE INVENTION

The present invention relates to cutting tools, and more particularly, to a method for making a sintered carbide cutting tool.

BACKGROUND AND SUMMARY OF THE INVENTION

Machine cutting tools can be produced from a variety of materials, including but not limited to carbon steel, high-speed steel, cobalt high-speed steel, tungsten carbide, and the like. Cutting tools made from cobalt and/or carbide can withstand higher operating temperatures and can thus be run at higher cutting speeds and feeds than tools made from carbon steel or high-speed steel. Cutting tools containing cobalt and/or carbide, however, may be more time consuming and costly to produce than tools made from carbon steel or high-speed steel due to the increased hardness of the materials.

There exists a variety of known manufacturing methods for producing cutting tools. For example, the process of producing a twist drill from carbon steel may involve rough milling a cylindrically-shaped blank to produce drill flutes in a straight line along the length of the blank. The milled blank can then be heated and twisted to form the flutes into a desired helix. The twist drill can then be semi-finished milled and ground to size. The manufacturing process generally becomes more complex and time consuming when producing cutting tools made from cobalt and/or carbide. For example, manufacturing twist drills from carbide may require more extensive and complex machining operations to produce than tools made from carbon steel of high-speed steel. The time and cost of producing cutting tools from cobalt and/or carbide could be reduced by producing a cutting tool blank that more nearly approximates the finished shape of the cutting tool. Accordingly, there is a need to develop an apparatus and method for manufacturing a cutting tool that more closely approximates the finished shape of the cutting tool being produced.

In accordance with the present invention, a preferred embodiment of a molding apparatus for making a cutting tool includes a cylindrically shaped elastic bag having an internal cavity for receiving a granulated material, such as a mixture of cobalt and carbide. The profile of the interior cavity substantially corresponds to the shape of the cutting tool being produced. The ends of the bag are open to provide access to the interior cavity of the bag. A further aspect of the invention includes a substantially rigid tubular-shaped pressure sleeve that encloses an outer circumference of the elastic bag. Yet another aspect of the invention includes a pair of end caps that operate to seal the open ends of the elastic bag and are engageable with the ends of the pressure sleeve. The granulated material can be formed into a solid coherent structure by placing the assembled mold containing the granulated material into a hydrostatic press for applying a substantially uniform compressive load to the outer periphery of the elastic bag. After forming, the cutting tool blank can be removed from the mold and may be subjected to further processing.

BRIEF DESCRIPTION OF THE DRAWINGS

The present invention will become more fully understood from the detailed description and the accompanying drawings, wherein.

DETAILED DESCRIPTION OF EMBODIMENTS

The following description of the preferred embodiment is merely exemplary in nature and is in no way intended to limit the invention, its application, or uses.

Figure 1:
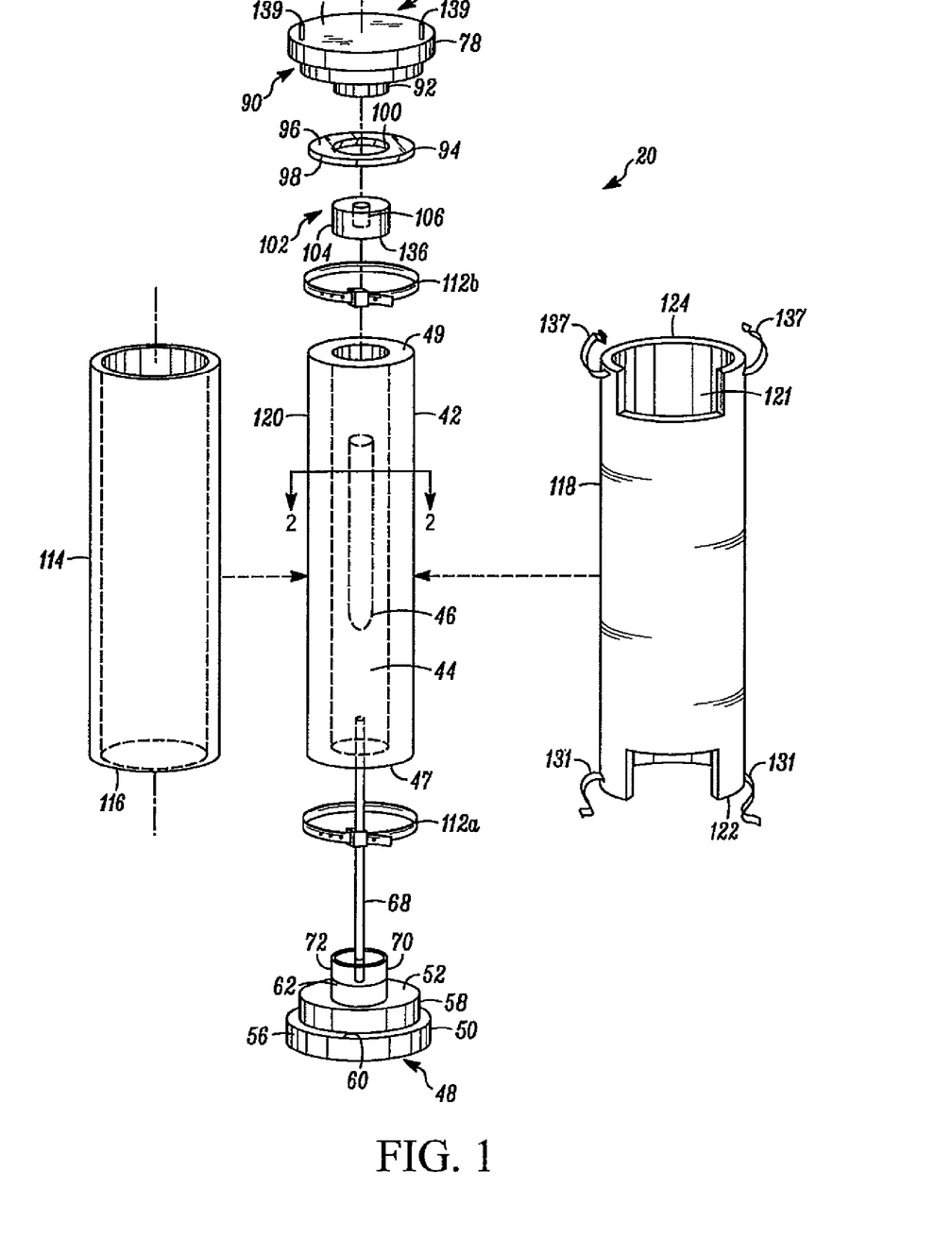
FIG. 1 is an exploded perspective view of a preferred embodiment mold of the present invention for manufacturing a cutting tool.

Referring to FIG. 1, there is shown a mold 20 for producing a cutting tool in accordance with the present invention. The cutting tool may have one or more internal passages. Mold 20 can be used to form a variety of differently configured cutting tools, such as end mills, reamers, twist drills, straight flute drills, and the like. The cutting tools may be formed from materials known to be used in the production of cutting tools, such as powdered carbide mixtures. One such carbide mixture consists of finely ground carbide and cobalt combined with one or more binder materials, such as wax. The binder material operates to hold the particles of material together when forming the carbide mixture into a desired shape. The carbide mixture may include, for example, 90% carbide, 9% cobalt, and 1% other trace elements by volume. A wax binder may also be added to the mixture in an approximate ratio of one (1) part wax binder to forty-nine (49) parts carbide mixture.

Figure 6A:
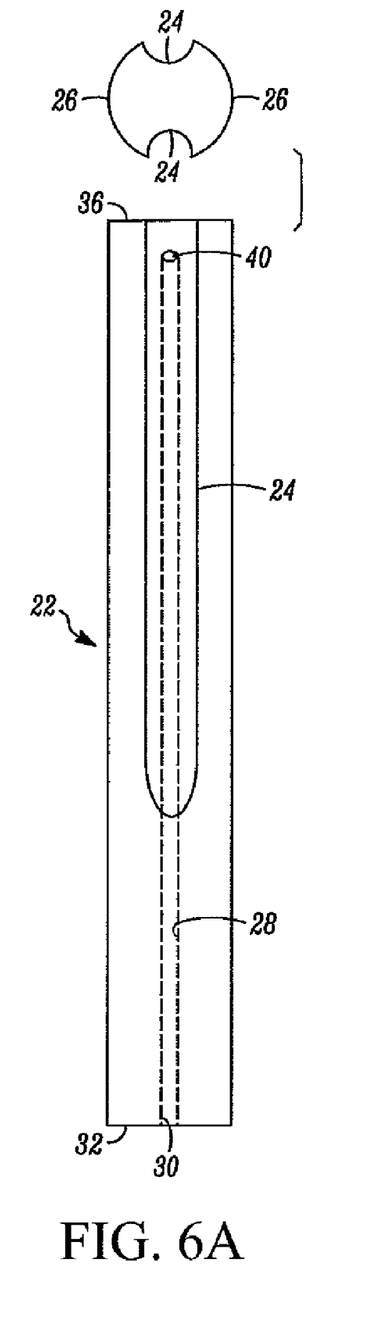
FIG. 6A is a side elevational view of an exemplary cutting tool that can be formed using the mold and method of the present invention.
Figure 6B:
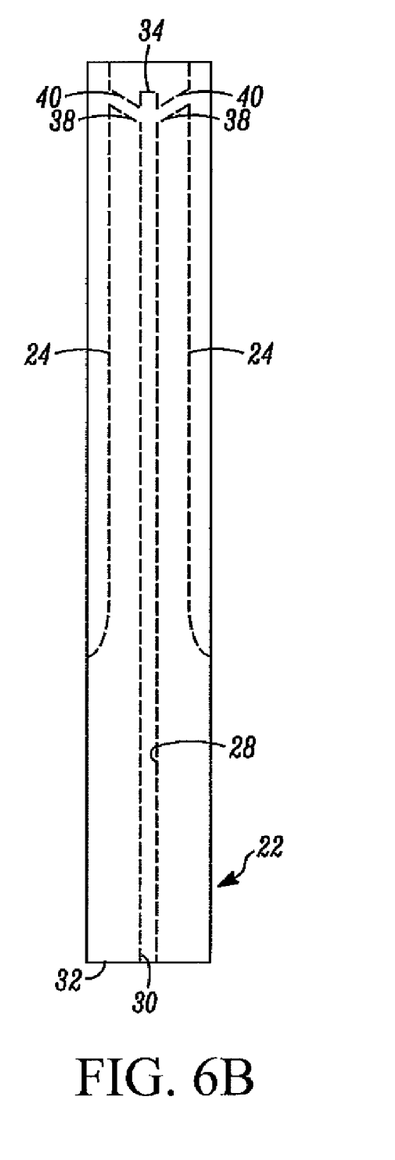
FIG. 6B is a side elevational view of the exemplary cutting tool shown in FIG. 4A, viewed perpendicular to the cutting flutes.

Referring to FIGS. 6A and 6B, there is shown an exemplary straight flute drill 22 that can be produced using mold 20 and the method of the present invention. Straight flute drill 22 is merely one example of the various types of cutting tools that can be produced using the mold and method of the present invention.

Straight flute drill 22 is shown to have a generally cylindrical shape. A pair of diametrically opposed recessed channels 24 extend lengthwise over a portion of straight flute drill 22. Channels 24 define edges of a pair of flutes 26 forming a cutting surface of straight flute drill 22.

Straight flute drill 22 includes an elongated internal passage 28 oriented along a central longitudinal axis of straight flute drill 22 for supplying a fluid to an end 36 of straight flute drill 22. Cooling passage 28 includes an inlet port 30 located in an end 32 of straight flute drill 22 opposite flutes 26. An end 34 of passage 28 opposite inlet 30 terminates short of end 36 of straight flute drill 22 so as to not penetrate end 36. A pair of opposing discharge passages 38 extend from passage 28 and have an exit port 40 located within recessed channel 24. Although passage 28 is shown to have a substantially linear tube-like configuration, it shall be appreciated that differently configured cooling passages may also be produced using mold 20, including but not limited to, helical shaped passages and passages having multiple inlet and exit ports.

Figure 2:
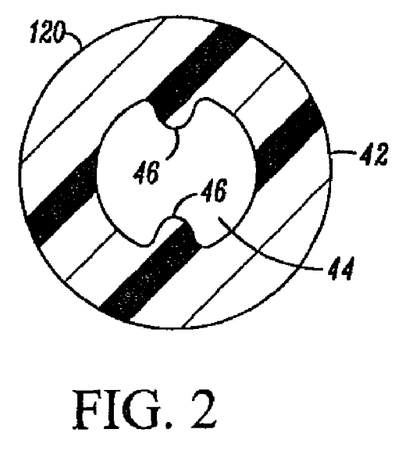
FIG. 2 is a cross-sectional view of a flexible bag employed in the preferred embodiment mold, taken along line 2-2 of FIG. 1.
Figure 3:
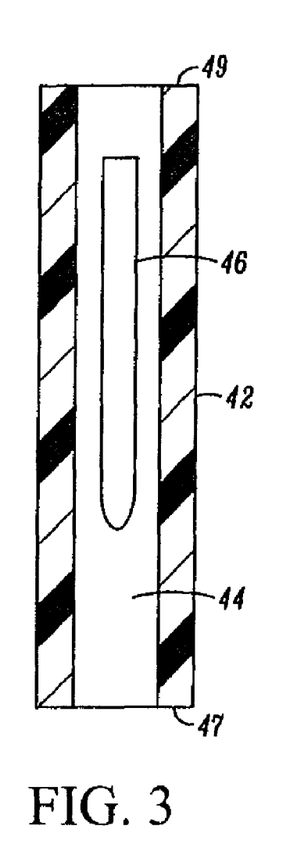
FIG. 3 is longitudinal cross-sectional view of the flexible bag employed in the preferred embodiment mold.

Referring to FIGS. 1-3, mold 20 includes a generally cylindrical-shaped bag 42 having a first end 47 and a second end 49. Bag 42 has a hollow interior cavity 44. For purposes of illustration, bag 42 is shown to have an interior profile corresponding to straight flute drill 22. It shall be appreciated, however, that bag 42 may also include a different interior profile depending on the particular cutting tool being produced. It shall also be understood the dimensions and/or profile of the cutting tool formed using bag 42 may differ from those of interior cavity 44. The dimension of interior cavity 44 may be larger than the resulting cutting tool due to compacting of the carbide material used to produce the cutting tool during the forming process.

Bag 42 preferably has a generally cylindrical shape with a circular cross-section. Other cross-sectional shapes, however, may also be used with satisfactory results, such as octagonal, hexagonal, and the like. Inner cavity 44 includes a pair of elongated ribs 46 protruding inward toward a center of cavity 44. Ribs 46 are positioned opposite one another at 180 degree intervals and correspond to recessed channels 24 of straight flute drill 24.

Bag 42 is preferably made from a resilient elastic material having a Durometer hardness of approximately 35-40, such as urethane, silicone, or another material having similar physical characteristics. It is preferable the bag material be capable of withstanding multiple compression cycles involving compressive loads in excess of 30,000 psi without incurring any appreciable degradation of the physical properties of the material. It is also preferable the bag material not incur a permanent set as a result of the compressive loads.

Referring also to FIGS. 4A-5B, mold 20 includes a first end cap 48 for sealing end 47 of bag 42. End cap 48 has a generally circular disk-shaped portion 50 having an end surface 52 engagable with end 47 of bag 42 when end cap 48 is attached to the bag. An L-shaped notch 54 extends around an entire circumference 56 of disk portion 50. A first surface 58 of notch 54 is oriented substantially parallel to a center axis of disk portion 50 and intersects end surface 52 of disk portion 50. A second surface 60 of notch 52 is oriented substantially perpendicular to the center axis of disk portion 50 and intersects outer circumference 56 of disk portion 50. Surface 58 preferably has a diameter larger than the diameter of bag 42. Although shown as having a generally circular-shaped outer perimeter, disk portion 50 may also be configured to have other shapes, such as hexagonal, octagonal, and the like. For example, if bag 42 has a hexagonal cross-sectional shape, it may be preferable that notch surface 58 also have a hexagonal shape. Similarly, it may also be desirable that outer circumference 56 also have a hexagonal shape.

Figure 4A:
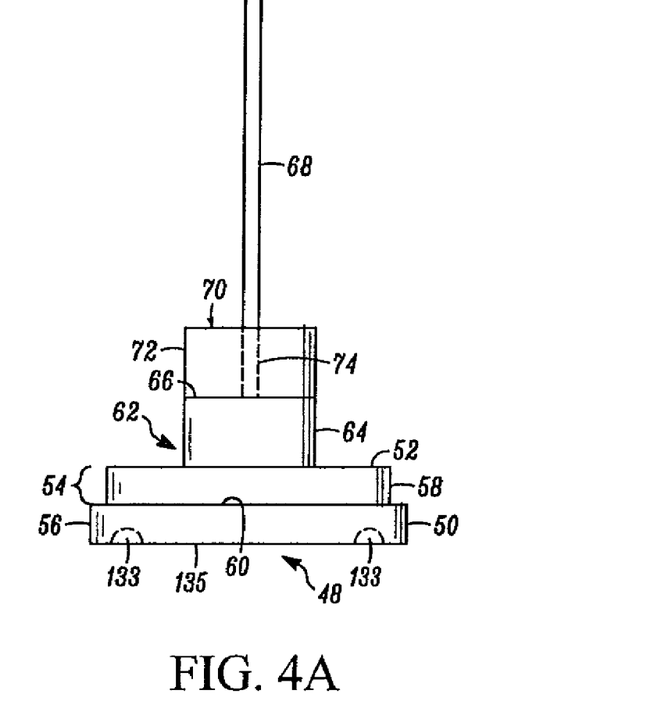
FIG. 4A is a side elevational view of an end cap incorporating a straight core pin employed in the preferred embodiment mold.
Figure 4B:
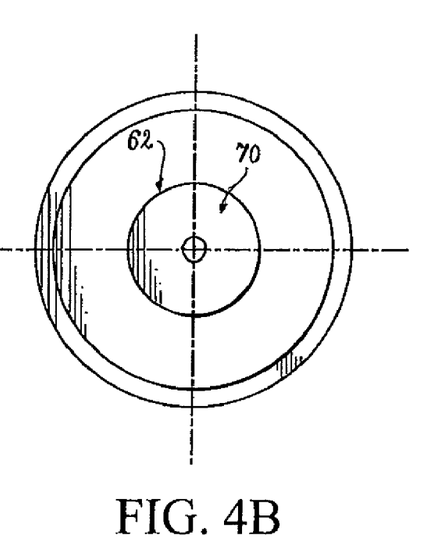
FIG. 4B is a top elevational view of the end cap incorporating a straight core pin.

Extending from end surface 52 of disk portion 50 is a cylindrically-shaped boss 62 having an outer circumference surface 64. A center axis of boss 62 substantially coincides with the center axis of disk portion 50. Boss 62 may be integrally formed with disk portion 50, or may be fixedly attached using any suitable method, such as brazing, welding, gluing, and the like. With end cap 48 attached to bag 42, boss 62 extends into cavity 44, wherein circumference 64 engages the interior periphery of cavity 44. The outer diameter of circumference 64 is preferably larger than the diameter of cavity 44 adjacent end 47 of bag 42 to produce an interference fit between bag 42 and boss 64 when attaching end cap 48 to bag 42.

Figure 14:
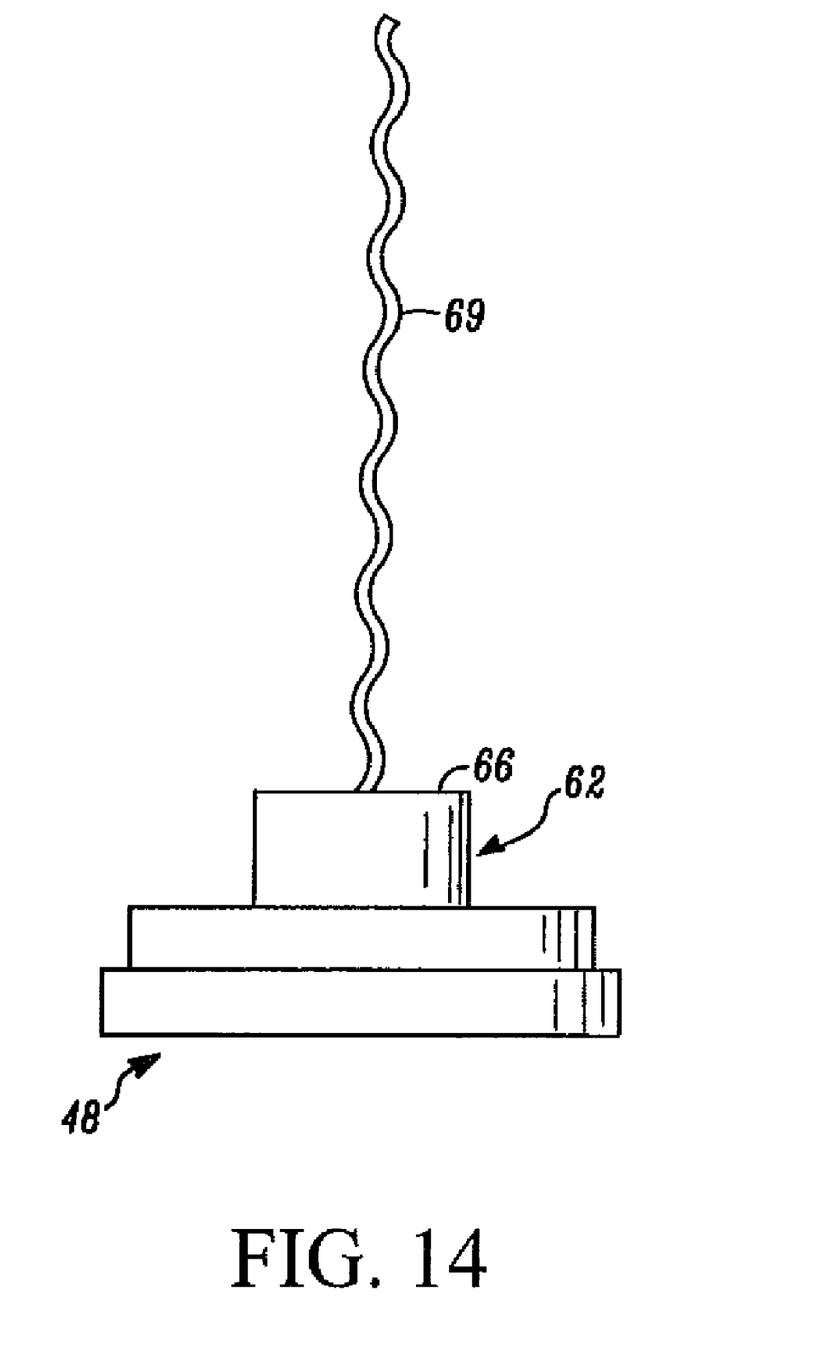
FIG. 14 is a side elevational view of an end cap incorporating a helical core pin employed in the preferred embodiment mold.

Attached to an end surface 66 of boss 62 opposite disk portion 50 is a core pin 68 for forming passage 28 of straight flute drill 22. Although core pin 68 is shown to have a rod-like shape, it shall be appreciated that core pin 68 may also be configured to produce a passage having a different shape, such as helical core pin 69 shown in FIG. 14. Core pin 68 may be permanently attached to boss 62 using any suitable means, such as welding, brazing, adhesives, and the like. Alternatively, core pin 68 may be removably attached to boss 62, such as by threading, to enable differently configured core pins to be readily interchanged.

A resilient cylindrically-shaped first transition member 70 having an outer circumference 72 adjoins end surface 66 of boss 62 opposite disk portion 50. First transition member 70 provides an elastic transition between rigid boss 62 and interior cavity 44 of bag 42 to minimize possible flaring of the end of the cutting tool formed using mold 20. A center axis of first transition member 70 substantially coincides with the center axis of boss 62 and disk portion 50. First transition member 70 includes a bore 74 oriented along the longitudinal center axis of first transition member 70. Bore 74 is engageable with core pin 68.

With end cap 48 attached to bag 42, first transition member 70 extends into cavity 44 enabling circumference 72 of the first transition member to engage the interior periphery of cavity 44. The outer diameter of circumference 72 preferably is larger than the diameter of cavity 44 adjacent end 47 of bag 42 so as to produce an interference fit between bag 42 and first transition member 70 when attaching end cap 48 to bag 42. First transition member 70 is preferably made of a resilient material, such as rubber, but may also be made of another material having similar properties.

Figure 7:
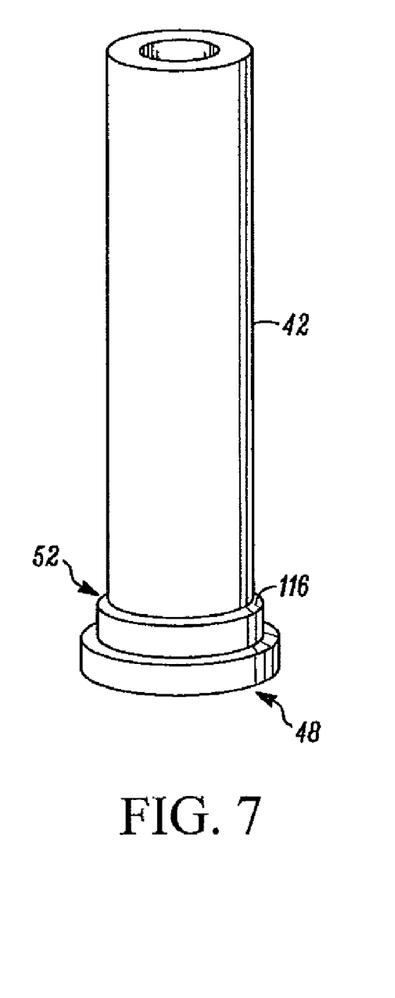
FIG. 7 is a perspective view of the flexible bag employed in the preferred embodiment mold shown with an end cap attached to one end of the bag.

End cap 48 can be attached to bag 42 by guiding core pin 68, first transition member 70, and boss 62 into cavity 44 of bag 42 until end surface 52 of disk portion 50 contacts end surface 47 of bag 42. Bag 42 may be secured to end cap 48 using a strap 112a. Strap 112a is preferably placed around bag 42 and in alignment with boss 62. Strap 112a can then be tightened to secure bag 42 to end cap 48.

Figure 5A:
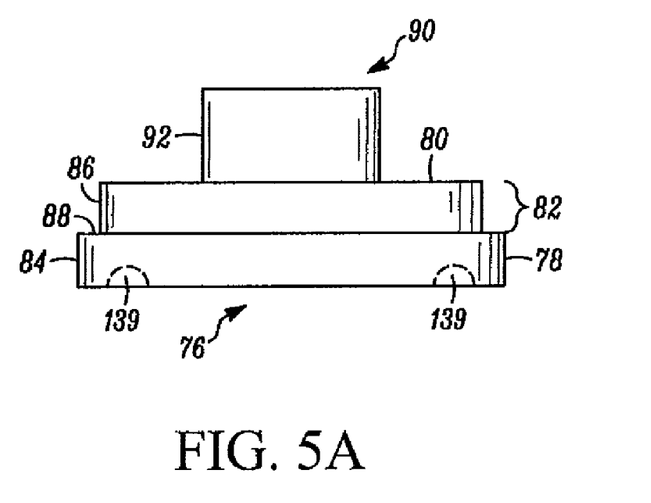
FIG. 5A is a side elevational view of a second end cap employed in the preferred embodiment mold.
Figure 5B:
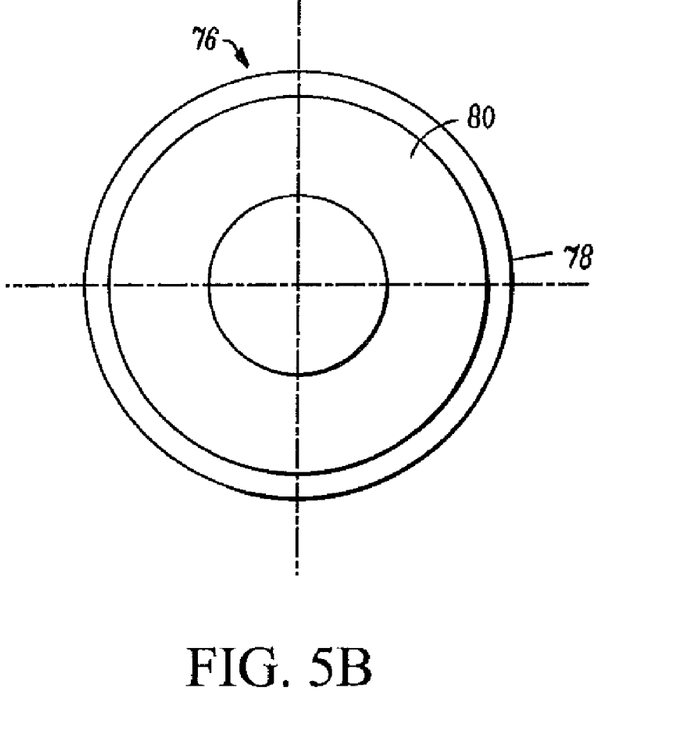
FIG. 5B is a top elevational view of the end cap shown in FIG. 5A.

Mold 20 further includes a second end cap 76 for sealing end 49 of bag 42 to prevent fluid from entering cavity 44 from the exterior of bag 42. End cap 76 has a generally circular disk-shaped portion 78 having an end surface 80 that is engageable with end 49 of bag 42 when end cap 76 is attached to bag 42. An L-shaped notch 82 extends around an entire circumference 84 of disk portion 78. A first surface 86 of notch 82 is oriented substantially parallel to a center axis of disk portion 78 and intersects end surface 80 of disk portion 78. A second surface 88 of notch 82 is oriented substantially perpendicular to the center axis of disk portion 78 and intersects outer circumference 84 of disk portion 78. Surface 86 preferably has a diameter larger than the outer diameter of bag 42.

Although shown as having a generally circular outer perimeter, disk portion 78 may also be provided with a different shape, such as hexagonal, octagonal, and the like, so as to substantially mirror the shape of the outer periphery of bag 42. For example, if the outer periphery of bag 42 has a hexagonal shape, it may be desirable that notch surface 86 likewise have a hexagonal shape. Similarly, it may also be desirable that outer circumference 84 of disk portion 78 also have a hexagonal shape.

Extending from end surface 80 of disk portion 78 is a cylindrically-shaped boss 90 having an outer circumference surface 92. A center axis of boss 90 substantially coincides with the center axis of disk portion 78. Boss 90 may be integrally formed with disk portion 78, or may be fixedly attached using any suitable method, such as brazing, welding, gluing, and the like. With end cap 76 attached to bag 42, boss 90 extends into cavity 44 so that circumference 92 engages the interior periphery of cavity 44 of bag 42. The outer diameter of circumference 92 of boss 90 is preferably larger than the interior diameter of cavity 44 of bag 42 to produce an interference fit between bag 42 and boss 90 when engaging end cap 76 with bag 42.

Mold 20 further includes a washer-shaped seal 94. Seal 94 is positionable between end cap 76 and bag 42 when end cap 76 is attached to bag 42. A first surface 96 of seal 94 is engagable with surface 80 of end cap 76, while an opposite surface 98 of seal 94 is engageable with end surface 49 of bag 42. Seal 94 includes a circular-shaped aperture 100 that is engagable with circumference 92 of boss 90. Aperture 100 preferably has a diameter smaller than the diameter of circumference 92 to produce an interference fit between seal 94 and boss 90 when the two components are assemble together. Seal 94 is preferably made from an resilient elastic material, such as rubber, or another material having similar physical properties.

A second transition member 102 having an outer circumference 104 is insertable within interior cavity 44 of bag 42. Second transition member 102 can be engaged with inner cavity 44 of bag 42 and operates to accomplish the same general function as first transition member 70 by providing an elastic transition between rigid boss 90 and interior cavity 44 of bag 42 to minimize possible flaring of the end of the cutting tool formed using mold 20. A threaded bore 106 is provided in one end of second transition member 102 for engaging a correspondingly threaded insertion tool 108 (see FIG. 11) that can be used for inserting second transition member 102 into cavity 44. With second transition member 102 inserted in cavity 44 of bag 42, outer circumference 104 of second transition member 102 engages the inner periphery of cavity 44. The outer diameter of circumference 104 preferably is larger than the inner diameter of cavity 44 adjacent end 49 of bag 42 to produce an interference fit between bag 42 and second transition member 102. Second transition member 102 is preferably made of a resilient material, such as rubber, or alternatively, another material having similar properties.

Figure 11:
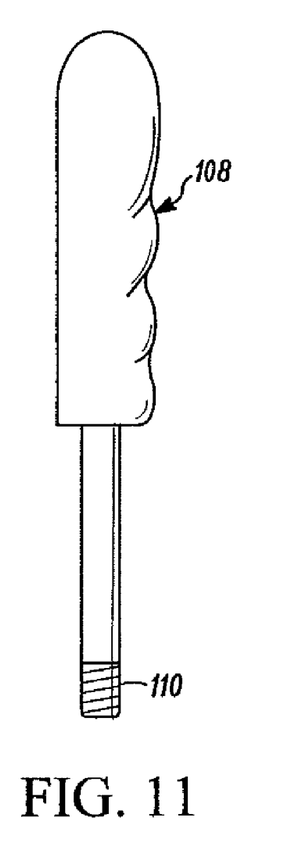
FIG. 11 is a side elevational view of a exemplary installation tool.

Second transition member 102 can be installed in cavity 44 of bag 42 by engaging a threaded end 110 of installation tool 108 with threaded bore 106 of second transition member 102. With second transition member 102 attached to installation tool 108, second transition member 106 can be inserted into cavity 44 of bag 42, after which installation tool 108 can be detached from second transition member 102. Seal 94 can be positioned adjacent end surface 49 of bag 42 with aperture 100 substantially aligned with the opening to cavity 44 in end 49 of bag 42. End cap 76 can be attached to bag 42 by guiding boss 90 into cavity 44 of bag 42 until end surface 80 of disk portion 78 contacts end surface 49 of bag 42. Bag 42 may be secured to end cap 76 using a strap 112b. Strap 112b is preferably positioned around bag 42 and in alignment with boss 90. Strap 112b can then be tightened to secure bag 42 to end cap 48.

Figure 8:
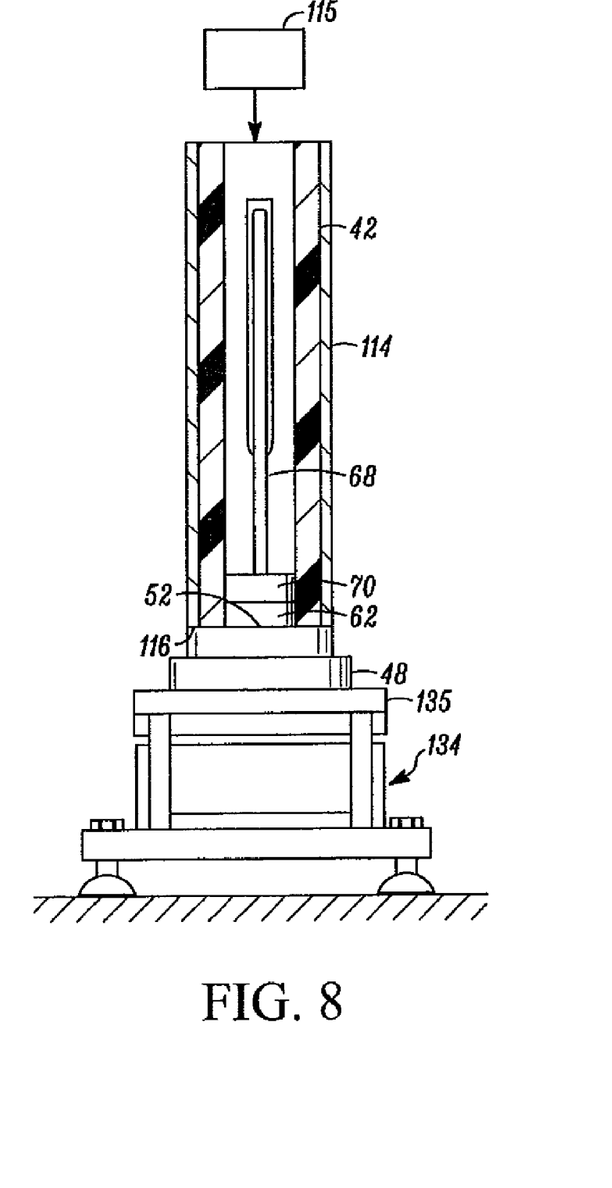
FIG. 8 is a side elevational view of certain components of the preferred embodiment mold shown being filled with a carbide mixture while resting on a mechanical vibrating plate, with certain components shown in cross-section.

Mold 20 may also include a fill sleeve 114 and a pressure sleeve 118. The two sleeves are not used simultaneously, with each serving a separate function. Referring also to FIG. 8, with end cap 76 removed from bag 42, fill sleeve 114 can be positioned over bag 42 prior to filling bag 42 with a powdered carbide mixture 115, or a like material having properties suitable for producing cutting tools. Filling bag 42 with carbide mixture 115 may cause bag 42 to expand due to the bag's elastic nature. Fill sleeve 114 operates to limit the amount of expansion that may occur during the filling process. Fill sleeve 114 has a generally hollow tubular shape with an inner diameter sufficiently large to allow fill sleeve 114 to be slid over bag 42. Fill sleeve 114 and bag 42 preferably are substantially the same length. An end 116 of fill sleeve 114 is engageable with surface 52 of end cap 48 when fill sleeve 114 is placed over bag 42. Bag 42 can be filled with a predetermined quantity of powdered carbide mixture 115. Fill sleeve 114 can be removed from bag 42 once cavity 44 is suitably filled with carbide mixture 115.

Figure 9:
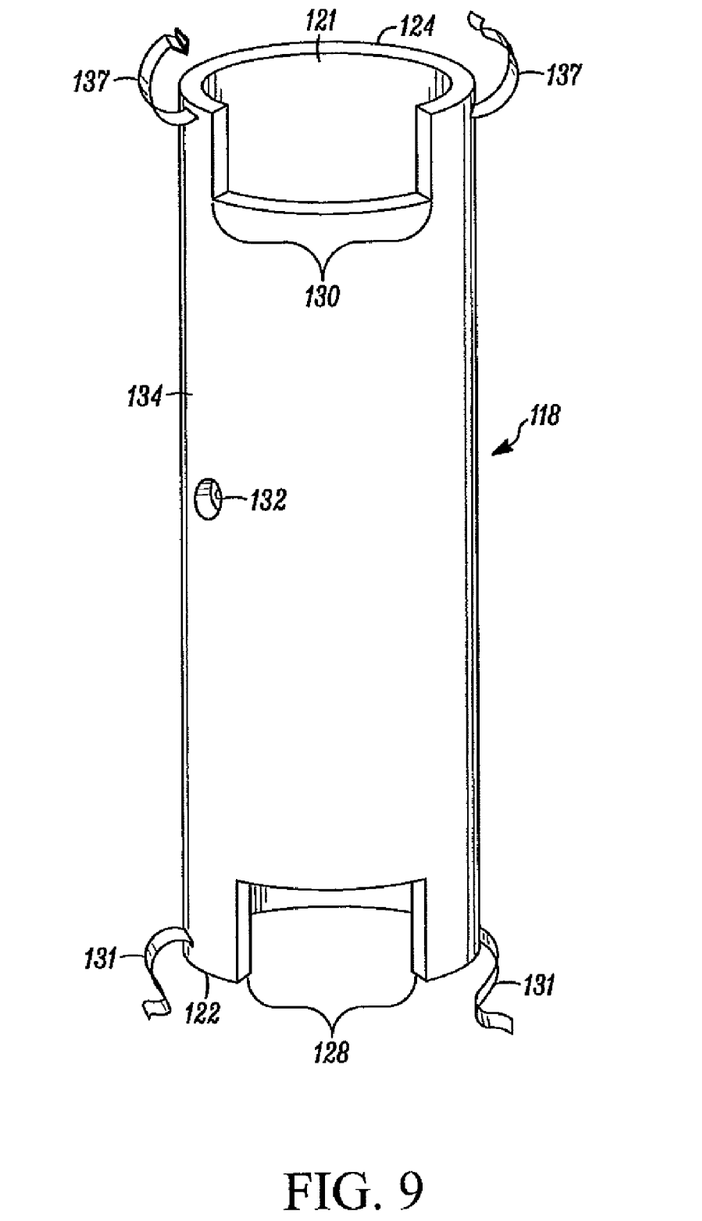
FIG. 9 is side perspective view of a pressure sleeve employed with the preferred embodiment mold.
Figure 10:
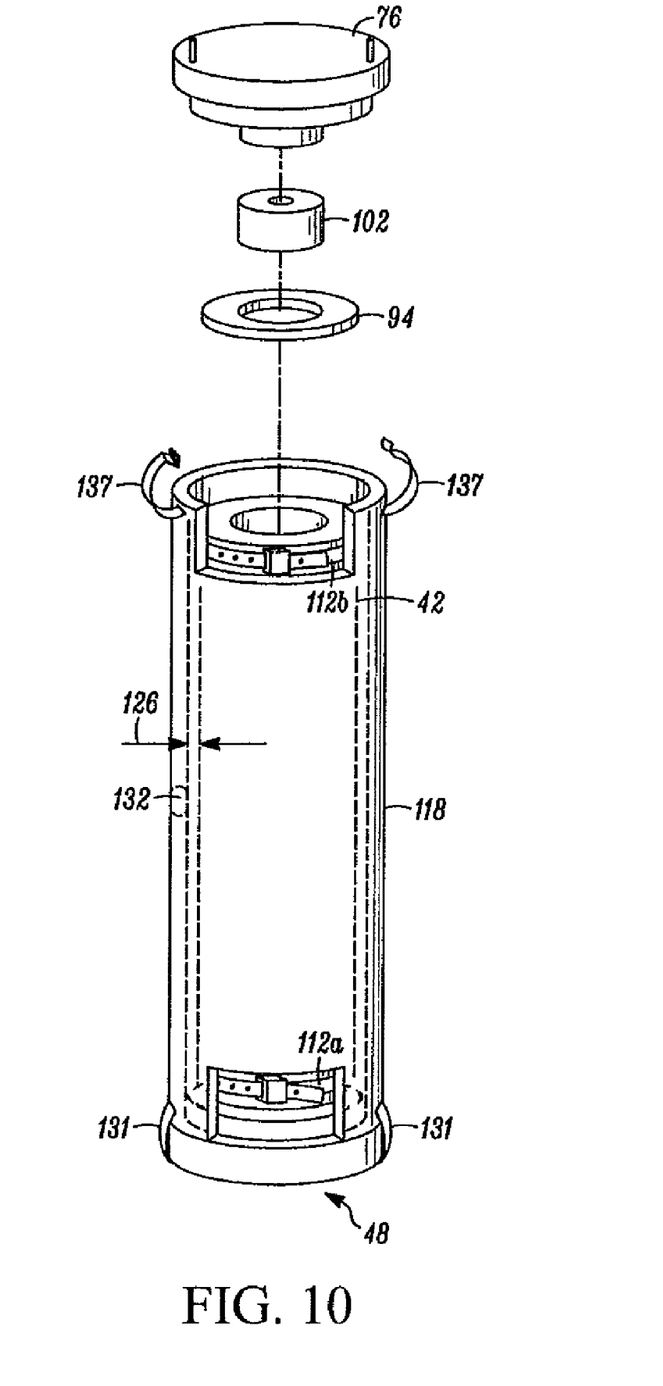
FIG. 10 is a side perspective view of the mold with certain components shown disassembled from the mold.

Referring also to FIGS. 9 and 10, mold 42 may also include a cylindrically-shaped pressure sleeve 118. Pressure sleeve 118 can be positioned over bag 42 so as to enclose at least a portion of the exterior periphery 120 of bag 42. Pressure sleeve 118 provides support for bag 42 and helps maintain proper alignment of the bag during the pressure forming processes. A first end 122 of pressure sleeve 118 is engageable with notch 54 formed in end cap 48 and a second end 124 is engageable with notch 82 formed in end cap 76. The diameter of an inner circumference 121 of first end 122 of pressure sleeve 118 is larger than the diameter of surface 58 of notch 54 to enable pressure sleeve 118 to slide over surface 58 and engage surface 60 of notch 54. Similarly, the diameter of inner circumference 121 of end 124 of pressure sleeve 118 is larger than the diameter of surface 86 of notch 82 to enable pressure sleeve 118 to slide over surface 86 and engage surface 88 of notch 82. The inside diameter of circumference 121 of pressure sleeve 118 is also preferably larger than the diameter of the exterior periphery 120 of bag 24 to produce a circumferential gap 126 between inner circumference 121 of pressure sleeve 118 and exterior periphery 120 of bag 42.

Each end 122 and 124 of pressure sleeve 118 includes a notched region 128 and 130, respectively. Notched regions 128 and 130 provide access to straps 112a and 112b, and allow fluid to enter gap 126 formed between pressure sleeve 118 and bag 42 during the forming process. One or more apertures 132 extend through a wall 134 of pressure sleeve 118 for fluidly connecting the exterior region of pressure sleeve 118 with the interior region of the pressure sleeve.

A cutting tool, such as straight flute drill 22, can be formed using mold 20 by assembling bag 42 to end cap 48. Strap 112a is not used to attach bag 42 to end cap 48 at this time. Fill sleeve 114 can be slid over bag 42 and end 116 of fill sleeve 114 can be engaged with end surface 52 of end cap 48. Bag 42 can then be filled with a predetermined quantity of powdered carbide mixture 115. To help compact carbide mixture 115 present in cavity 44 of bag 42, end cap 48, fill sleeve 114, and bag 42 can be placed on a mechanical vibrating plate 134, or another similar device. Vibrating plate 134 includes a plate 135 that can made to vibrate at a predetermined frequency. Vibrating the end cap/fill sleeve/bag assembly (48,114,42) helps to eliminate voids that could form in carbide mixture 115 and prevent cavity 44 from being filled with the desired quantity of carbide mixture 115. Sleeve 114 can be removed from bag 42 after the bag is filled with the desired quantity of carbide mixture 115.

After bag 42 has been filled with carbide mixture 115, end 47 of bag 42 may be secured to end cap 48 using strap 112a. Pressure sleeve 118 is then slid over bag 42 and end 122 of pressure sleeve 118 is engaged with notch 54 of end cap 48. Second strap 112b is initially loosely installed around end 49 of bag 42. End cap 48 may be secured to pressure sleeve 118 by releasably engaging a pair of clips 131 with a pair of pockets 133 formed in an end surface 135 of end cap 48. Second transition member 102 can be attached to installation tool 108 and inserted into cavity 44 of bag 42 to the point where end surface 136 of second transition member 102 contacts carbide mixture 115, End 49 of bag 42 is sealed to prevent fluid from entering cavity 44 from the exterior region of bag 42 by positioning seal 94 adjacent end 49 of bag 42. End cap 76 is then attached to end 49 of bag 42 by guiding boss 92 of end cap 76 into cavity 44 of bag 42 until notch 82 of end cap 76 engages end 124 of pressure sleeve 118. End cap 76 can be secured to end 49 of bag 42 by tightening second strap 112b around bag 42. End cap 76 may also be secured to pressure sleeve 118 by releasably engaging a pair of clips 137 with a pair of pockets 139 formed in an end surface 139 of end cap 76.

Figure 13:
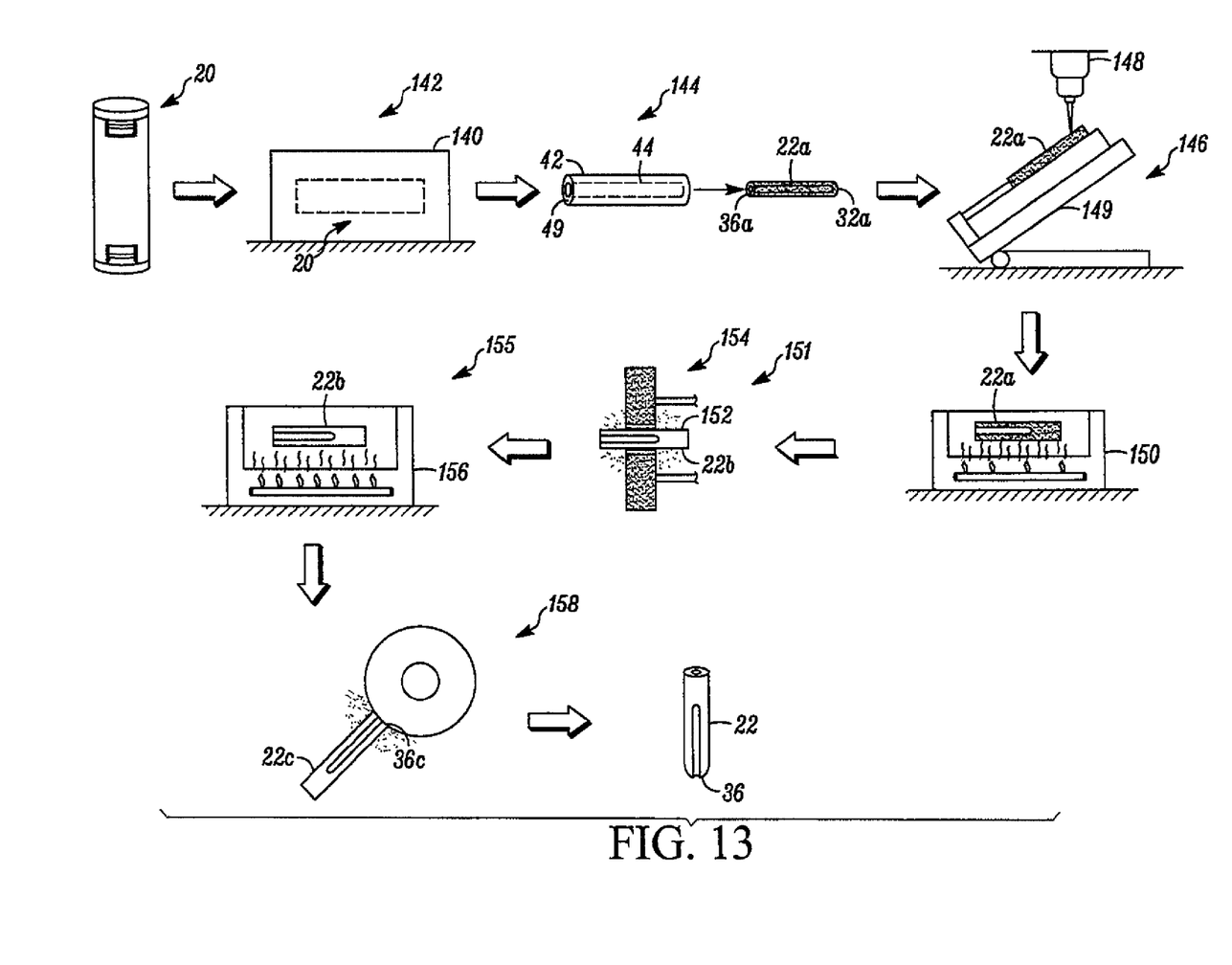
FIG. 13 is a diagrammatic representation of a method for forming a cutting tool using the preferred embodiment mold.

Referring to FIG. 13, carbide mixture 115 can be pressed into a solid form using a known isostatic press 140, or a similar device. Mold 20 containing carbide mixture 115 is placed in isostatic press 140, whereupon the isostatic press is activated (see step 142). Isostatic press 140 utilizes a high pressure liquid, preferably operating at a pressure in excess of 20,000 psi, to apply a generally uniform compressive load to at least a portion of the exterior of mold 20. The high pressure fluid flows through orifice 132 and notched regions 128 and 130 of pressure sleeve 118 into gap 126 formed between bag 42 and pressure sleeve 116. The high pressure fluid present in gap 126 exerts a substantially uniform pressure along at least a portion of exterior surface 120 of bag 42. The high pressure fluid causes bag 42 to compress radially, compacting carbide mixture 115 into a cohesive structure. Rigid pressure sleeve 118 prevents carbide mixture 115 from being compressed axially. After compressing carbide mixture 115 for a predetermined period of time, the high pressure fluid surrounding mold 20 is discharged and mold 20 is removed from isostatic press 140.

Figure 12:
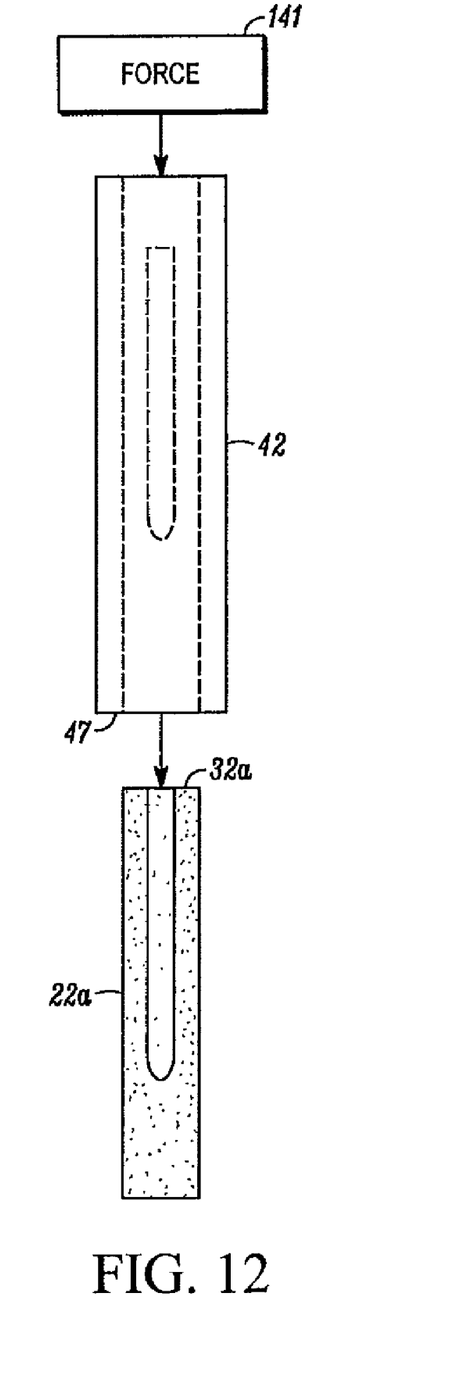
FIG. 12 is a side elevational view of the flexible bag showing the exemplary cutting tool of FIGS. 6A and 6B being separated from the bag.

Bag 42 containing the compressed carbide mixture can be separated from mold 20 by first disengaging clips 131 from end cap 48 and clips 137 from end cap 76. Straps 112a and 112b can then be released to allow end caps 76 and 48 to be detached from bag 42. Bag 42 can then be withdraw from pressure sleeve 118. Transition member 102 can be removed from cavity 44 of bag 42 using installation tool 108. Referring to FIG. 12 and step 144 of FIG. 13, a "green state" straight flute drill 22a, being of substantially the same configuration as straight flute drill 22 (see FIGS. 6A and 6B) can be extracted from bag 42 by applying a force 141 to the fluted end 32a of straight flute drill 22a to force straight flute drill 22a out through the access opening to cavity 44 located in end 47 of bag 42.

Continuing to refer to FIG. 10, in step 146 cooling passages 38 (see FIGS. 6A and 6B), are drilled in straight flute drill 22a using a drill press 148, or another suitable tool. To ensure proper orientation of cooling passages 38, straight flute drill 22a may be placed in a suitably configured fixture 149. To facilitate machining of cooling passages 38, it is preferable the cooling passages be drilled while straight flute drill 22a is in a "green state" prior to undergoing heat treatment. Alternatively, the cooling passages may be formed at any other desired stage of the forming process.

After machining cooling passages 38, straight flute drill 22a can be placed in a pre-sintering furnace 150 preheated to a predetermined temperature, for example 600° F. Heating straight flute drill 22a causes the wax binder to be removed from straight flute drill 22a. Straight flute drill 22a is maintained at the elevated temperature for a predetermined period of time after which it is removed from pre-sintering furnace 150 and allowed to cool to approximately room temperature. The heat treated straight flute drill is identified by reference number 22b.

After straight flute drill 22b has sufficiently cooled, an outer circumference 152 of straight flute drill 22b may be ground to achieve a desired surface finish and diameter using a conventional centerless grinder 154, or another suitable apparatus (see step 151). Straight flute drill 22b can then be heated in a high temperature sintering furnace 156 preheated to a predetermined temperature in step 155. Sintering furnace 156 is preferably capable of performing a known heating cycle so as to cause the individual particles in carbide mixture 115 to bind together and form a unitary solid straight flute drill 22c having certain desirable physical properties that enable straight flute drill 22c to function as a cutting tool. If desired, straight flute drill 22c may undergo further processing in step 158 after being removed from sintering furnace 156, such as grinding cutting flutes on an end 36c of straight flute drill 22c using conventional grinding methods in step.

While various aspects of the mold have been disclosed, it will be appreciated that many other variations may be incorporated without departing from the scope of the present invention. It is intended by the following claims to cover these and any other departures from the disclosed embodiments that fall within the true spirit of the invention. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for forming a cutting tool from a granulated mixture of one or more materials, the method comprising the steps of:

attaching a first end cap having a core pin to a first end of an elastic bag having an interior cavity;

filling the interior cavity of the bag with a predetermined quantity of the granulated mixture;

placing a pressure sleeve over the filled elastic bag such that a first end of the pressure sleeve engages the first end cap;

attaching a second end cap to a second end of elastic bag and a second end of the pressure sleeve; and applying a predetermined pressure load substantially uniformly over at least a portion of an exterior of the elastic bag, wherein applying the predetermined pressure load substantially uniformly over at least a portion of an exterior of the elastic bag compresses the granulated mixture into a substantially solid unitary piece while the core pin forms a coolant channel.

2. The method of claim 1, wherein an isostatic press is used to apply the predetermined pressure load to the exterior of the elastic bag.

3. The method of claim 1 further comprising the steps of:
disengaging the first end cap from the first end of the pressure sleeve and the first end of the bag, and disengaging the second end cap from the second end of the pressure sleeve and the second end of the bag; and
extracting the cutting tool from the bag.

4. The method of claim 1 further comprising the step of:
vibrating the elastic bag and first end cap while filling the interior cavity with the granulated mixture.

5. The method of claim 1 wherein attaching the first end cap to the elastic bag comprises connecting the elastic bag to the first end cap using a strap.

6. The method of claim 1, wherein a wall of the pressure sleeve defines at least one orifice and wherein applying a predetermined pressure load is performed via the at least one orifice.

7. The method of claim 1, wherein an interior surface of the sleeve and the exterior of the elastic bag define an annulus, and wherein the predetermined pressure load is a high-pressure fluid supplied to the annulus.

8. The method of claim 1, wherein the elastic bag is made from a resilient elastic material having a Durometer hardness of between about 35 and 40.

9. The method of claim 1, wherein the one or more materials of the granulated mixture comprise carbide, cobalt and less than five percent by volume wax.

10. The method of claim 1, wherein at least a portion of the core pin is configured as a spiral.

11. The method of claim 1, wherein the internal cavity of the elastic bag has a profile substantially corresponding to a shape of the cutting tool.

12. The method of claim 1, wherein the second end cap comprises an outer portion having a first diameter, an intermediate portion having a second diameter, wherein the second diameter is smaller than the first diameter, and a boss, and
wherein attaching the second end cap comprises frictionally engaging an exterior circumference of the boss with an internal circumference of the second end of the elastic bag.

13. The method of claim 1 further comprising:
selecting the elastic bag out of a plurality of elastic bags prior to attaching a first end cap, each elastic bag having a different internal profile of a cutting tool.

14. A method for forming a cutting tool from a granulated mixture of one or more materials, the method comprising the steps of:
attaching a first end cap having a core pin to a first end of an elastic bag having an interior cavity;
placing a fill sleeve over the elastic bag after attaching the first end cap, such that a first end of the fill sleeve engages the first end cap;
filling the interior cavity of the bag with a predetermined quantity of the granulated mixture;
after filling the interior cavity of the elastic bag, disengaging the fill sleeve from the first end cap and removing the fill sleeve from around the bag;
placing a pressure sleeve over the filled elastic bag such that a first end of the pressure sleeve engages the first end cap;
attaching a second end cap to a second end of elastic bag and a second end of the pressure sleeve; and
applying a predetermined pressure load substantially uniformly over at least a portion of an exterior of the elastic bag.

15. The method of claim 14 wherein applying the predetermined pressure load substantially uniformly over at least a portion of an exterior of the elastic bag compresses the granulated mixture into a substantially solid unitary piece while the core pin forms a coolant channel.

16. A method for forming a cutting tool from a granulated mixture of one or more materials, the method comprising the steps of:
attaching a first end cap having a core pin to a first end of an elastic bag having an interior cavity;
filling the interior cavity of the bag with a predetermined quantity of the granulated mixture;
placing a pressure sleeve over the filled elastic bag such that a first end of the pressure sleeve engages the first end cap;
attaching a second end cap to a second end of elastic bag and a second end of the pressure sleeve; and
applying a predetermined pressure load substantially uniformly over at least a portion of an exterior of the elastic bag, wherein the first end cap comprises an outer portion having a first diameter, an intermediate portion having a second diameter smaller than the first diameter, the intermediate portion raised from the outer portion, and a boss extending from the intermediate portion, and
wherein attaching the first end cap comprises frictionally engaging an exterior circumference of the boss with an internal circumference of the first end of the elastic bag.

17. The method of claim 16, wherein engaging the first end of the pressure sleeve with the first end cap comprises engaging an exterior circumference of the intermediate portion with an interior circumference of the first end of the pressure sleeve.

18. The method of claim 16 wherein the boss comprises an elastic transition member engagable with the internal circumference.

19. The method of claim 16, wherein the outer portion and the intermediate portion of the first end cap form a notched region for receiving the first end of the removable pressure sleeve.

20. The method of claim 16 wherein the core pin extends from an end surface of the boss for producing an internal passage in the cutting tool.

* * * * *